Dec. 4, 1934.  F. W. FINK  1,983,358
AIRCRAFT LANDING GEAR HOLDING DEVICE
Filed June 10, 1933   2 Sheets-Sheet 1
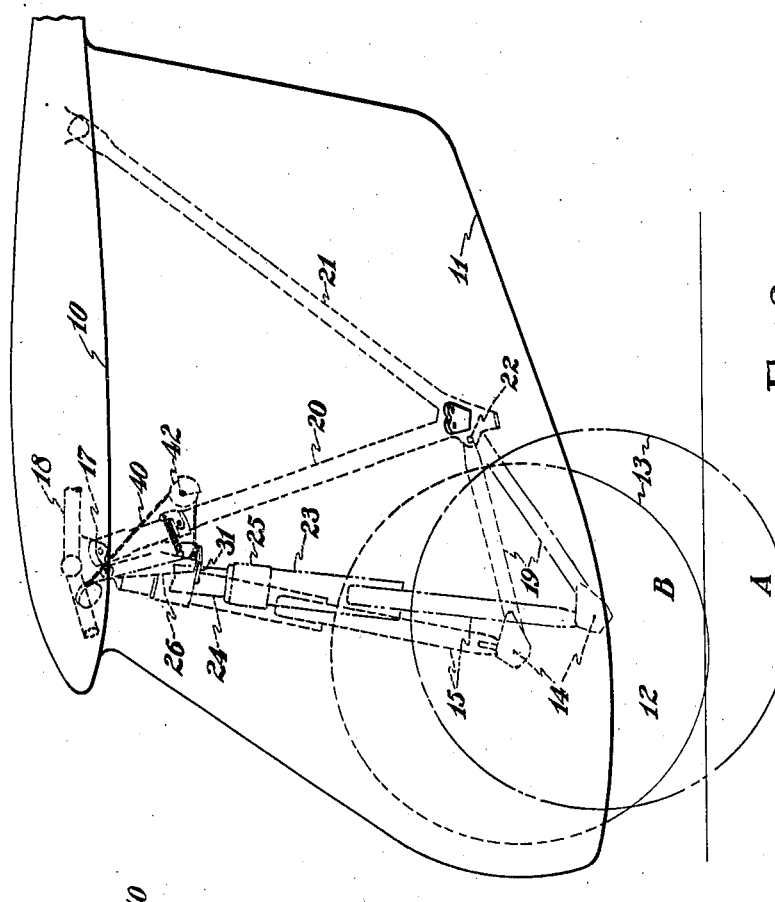
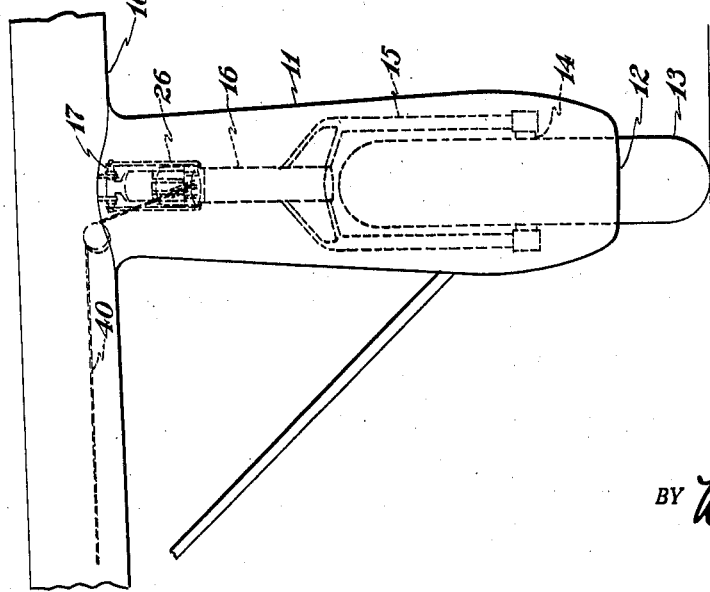
INVENTOR.
FRANK W. FINK.
BY
ATTORNEYS.

Dec. 4, 1934.  F. W. FINK  1,983,358
AIRCRAFT LANDING GEAR HOLDING DEVICE
Filed June 10, 1933   2 Sheets-Sheet 2

INVENTOR.
FRANK W. FINK.
BY
ATTORNEYS.

Patented Dec. 4, 1934

1,983,358

UNITED STATES PATENT OFFICE 1,983,358

AIRCRAFT LANDING GEAR HOLDING DEVICE

Frank W. Fink, Kenmore, N. Y., assignor to Curtiss Aeroplane & Motor Company, Inc., a corporation of New York Application June 10, 1933, Serial No. 675,204

4 Claims. (Cl. 244—2)

This invention relates to aircraft landing gears, and more particularly concerns improvements in mechanisms for use in conjunction with that type of landing gear which includes a wheel fairing carried by the aircraft and a wheel adapted to project from an opening in the lower part of said fairing for contact with the ground.

Certain types of aircraft are equipped with trunk-like fairings, sometimes known as pants, which fixedly depend from the wing or fuselage. Within this fairing, the landing gear structure is housed, which structure usually includes a telescoping shock absorbing strut to the lower end of which the wheel is connected. The wheel is adapted to project downwardly through an opening in the fairing, and is so arranged that when the aircraft is in flight, the wheel depends from the fairing, by virtue of the extension of the shock absorbing strut, a substantial distance below said fairing. Upon landing, the landing forces on the wheel telescope the shock absorbing strut so that, in the landing attitude of the aircraft, the wheel projects only a slight amount below the fairing. Although the wheel fairing has a considerable effect in reducing the drag of the aircraft, it is obvious, that when the aircraft is in flight, that portion of the wheel protruding from the fairing gives an added resistance which might well be overcome. In practice, it has been determined that a gain in speed of two miles per hour may be obtained by keeping the landing wheel housed substantially completely within the wheel fairing when the aircraft is in flight, rather than allowing it to depend from said fairing as it would normally do, and as is necessary when the aircraft is preparing to land.

An object of the invention is to provide mechanism for holding the landing gear in a partly collapsed position.

A further object is to provide control means whereby the landing gear may be allowed to completely extend at such time as the aircraft may be preparing for a landing.

A further object is to provide mechanism engageable to hold the landing gear in a partly collapsed position, which mechanism is also operative to absorb rebound shocks caused as the aircraft rolls or taxies over the ground.

A still further object of the invention is to provide means for resiliently engaging a mechanism with the landing gear, said mechanism being adapted to hold said landing gear in a partly collapsed condition.

Further objects will be apparent from a reading of the subjoined specification and claims and from a consideration of the accompanying drawings, in which similar numbers indicate similar parts, and in which:

Fig. 1 is a front elevation of a portion of an airplane including the landing gear;

Fig. 2 is a side elevation of the same elements of the aircraft shown in Fig. 1;

Figure 3:
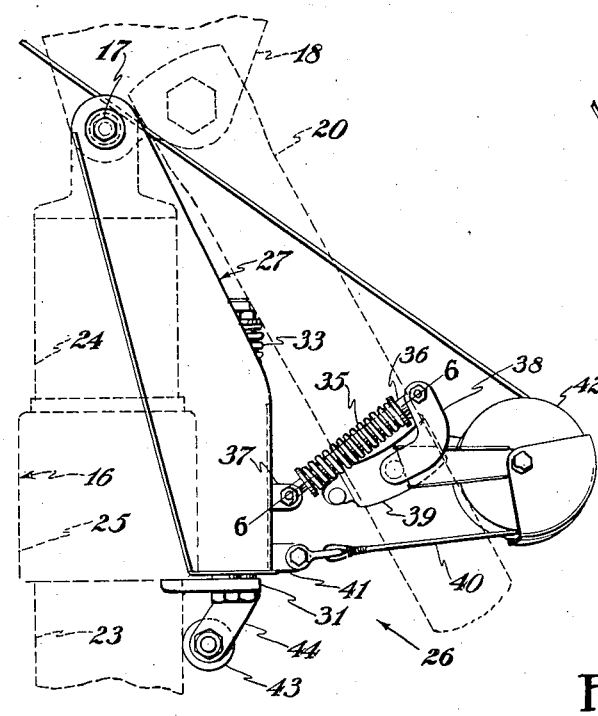
Fig. 3 is a side detail elevation of the mechanism of this invention, including certain parts of the aircraft landing gear to which it is attached.

The type of aircraft to which my invention is adapted to be applied includes a wing 10 from the lower surface of which depends a stream-lined trunk fairing 11, the lower portion 12 of which is substantially parallel to the ground, and in which portion 12 is formed an opening through which a wheel 13 may move up and down as landing shocks are imposed thereon by the engagement of said wheel with the ground. The wheel is borne for rotation on an axle 14 held by a fork 15 at the upper end of which is rigidly mounted a shock absorbing strut 16. The strut is pivoted at its upper end, as at 17 to a portion of the airplane framework indicated at 18. To hold the wheel from forward and rearward travel when it engages the ground, a rearwardly extending strut 19, pivoted to the wheel axle 14, is also pivoted to brace members 20 and 21, as at 22. The brace members 20 and 21 are rigidly attached to the airplane structure 18.

The shock absorbing strut 16 comprises a lower cylinder 23 adapted to telescope over a plunger 24, the upper end of which forms the upper part of the shock absorbing strut 16 and is pivoted to the airplane structure at 17. The cylinder 23 is provided at its upper end with a collar 25 which may be conveniently a part of the packing gland adapted to retain liquid within shock absorbing struts of the conventional oleo or oleo pneumatic type.

It is apparent that in the operation of this landing gear, referring to Fig. 2, the wheel 13 may extend a substantial distance below the fairing 11, as shown at A, when the aircraft is in flight. In the landing attitude, or when the aircraft rests upon the ground, the wheel, by the weight of the aircraft, is pressed upwardly within the fairing, as shown at B. Obviously, it would be desirable to be able to hold the wheel 13 in the position shown at B when the aircraft is in flight, and it is with this purpose in view that I provide a latch mechanism 26 adapted to engage with a portion of the shock absorbing strut 16, which may be operated by the aircraft crew to retain the landing gear in a more or less retracted position when the aircraft is in flight.

Figure 4:
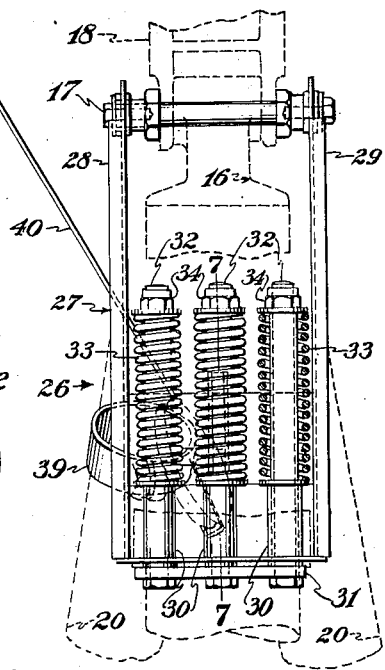
Fig. 4 is a front elevation of the invention.
Figure 5:
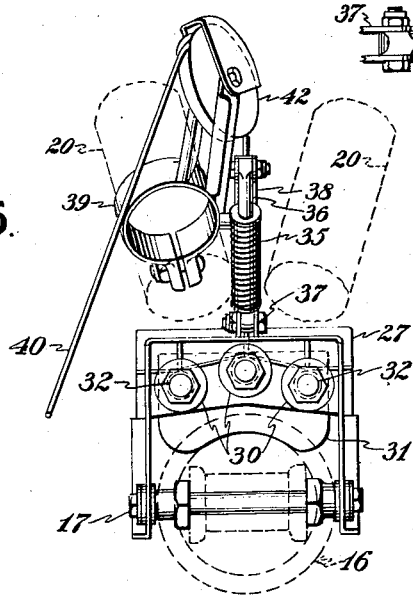
Fig. 5 is a plan.
Figure 6:
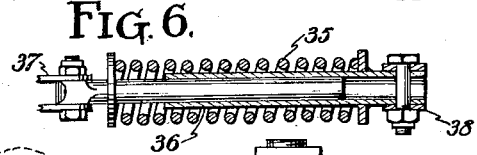
Fig. 6 is a section on the line 6—6 of Fig. 3.
Figure 7:
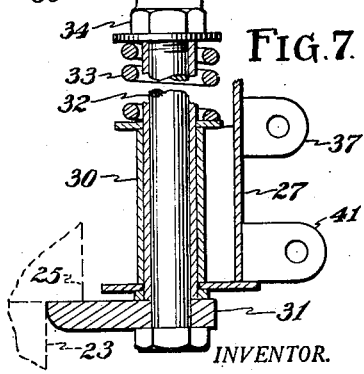
Fig. 7 is an enlarged section on the line 7—7 of Fig. 4.

Figs. 3 to 7, inclusive, show the detailed construction of the latch mechanism 26. A bracket 27 comprising a pair of spaced members 28 and 29, is hinged to the strut pivot 17. The lower part of the bracket 27 is provided with a plurality of spaced vertical bearing sleeves 30. A latch 31 is formed to partially encircle the shock absorbing strut and is provided with a plurality of vertically extending bolts 32 spaced so that they may slide in the sleeves 30. A spring 33 surrounds each bolt 32, bearing at its lower end on the sleeve 30 and being held at its upper end by a nut 34 screwed on the bolt 32. Thus, the springs constantly resiliently urge the latch 31 toward its extreme upper limiting position against the bracket 27.

Means are provided to urge the latch 31 toward engagement with the shock absorbing strut 16, comprising a compression spring 35 mounted on a telescoping member 36 connected at its ends with a clip 37 mounted on the bracket 27, and a clip 38 anchored to one of the braces 20 by a clamp 39. A cable 40, pivotally attached to a clip 41 mounted on the bracket 27, is arranged to pass over a pulley 42 carried by the clamp 39, and to pass upwardly to some point within the aircraft conveniently within reach of the aircraft crew.

The operation of the mechanism is as follows: When the aircraft is on the ground and the landing gear in position B of Fig. 2, the cable 40 may be relaxed, allowing the spring 35 to push the bracket 27 and the latch 31 into engagement with the shock absorbing strut. The latch engages under the lower shoulder of the projection 25. As the aircraft taxies along the ground, the cylinder 23 may move upwardly with respect to the plunger 24 upon imposition of shock. Rebound causes the cylinder to extend from the plunger, and by the engagement of the latch 31 under the shoulder of the projection 25, rebound is retarded by the action of the springs 33 carried by the latch mechanism 26. The aircraft is flown with the latch mechanism in its latched position—when the aircraft leaves the ground, the wheel may extend from fairing only so far as the latch 31 will permit extension of the shock absorbing strut 16. When preparing for a landing, the pilot may pull the cable 40, overcoming the spring 35 to withdraw the bracket 27 with the latch 31 from engagement with the shock absorbing strut. Thereupon, said strut may extend to the full extent, as shown in the position A of Fig. 2. Upon landing, the stage of telescoping of the strut between positions A and B is utilized in absorption of landing shocks according to well known principles. Thereafter, the latch mechanism may be allowed to engage with the strut while the aircraft rests on the ground.

A roller 43 is rotatably held in a bracket 44 carried on the bottom of the latch 31, this roller being provided to bear on the strut to space the latch 31 a small distance from the shock absorbing strut in order that said latch may not scrape and abrade the strut.

It will be seen that operation of the mechanism requires only tensioning or relaxing of the cable 40 and, while this effect when properly operated may produce a substantial gain in speed for the aircraft, it is so arranged that should any part of the mechanism fail, there will be no possibility of its interfering with the proper action of the landing gear in service. Inadvertent forgetfulness on the part of the pilot in neglecting to operate the mechanism will not have the effect, sometimes encountered in conjunction with fully retractable landing gears, of forcing him to make a landing with the wheels retracted, resulting in damage to the aircraft. If the wheels are left extended, the only disadvantage is a slight loss in speed.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

What is claimed is:

1. In an aircraft landing gear having a telescoping shock absorber strut adapted to be partly telescoped upon landing of the aircraft, latch mechanism engageable with a portion of said strut when said strut is partially telescoped to restrain said strut from full extension, means for engaging and disengaging said latch from said strut, and resilient means forming part of said latch mechanism adapted to urge said strut toward a fully telescoped position when said latch is engaged with said strut.

2. In an aircraft landing gear having a telescoping shock absorber strut pivoted to the aircraft, a bracket carried for angular movement toward and away from said strut, resilient means urging said bracket toward said strut, manually operable means for drawing said bracket away from said strut, a latch movable with and with respect to said bracket and engageable with said strut when said bracket is moved towards said strut, and resilient means for urging said latch toward an extreme of its movement with respect to said bracket.

3. In aircraft, in combination, a wing, a fixed landing gear fairing depending from said wing, a landing gear housed within said fairing and having a wheel extending from said fairing for ground contact, said landing gear having an extended position wherein said wheel protrudes a substantial distance from said fairing, and a deflected position wherein said wheel projects only slightly from said fairing, such position being effected by the weight of said aircraft resting on said wheel, and means engageable with said landing gear when deflected, to hold said landing gear in its deflected position.

4. In aircraft, a landing gear including a deflectable shock absorber for absorbing landing shocks, a fairing for minimizing the air resistance of said landing gear, and means resiliently engaging said shock absorber for optionally holding said shock absorber in a deflected position and said landing gear substantially within said fairing when said aircraft is in flight.

FRANK W. FINK.